United States Patent
De Brito et al.

(10) Patent No.: US 8,498,755 B2
(45) Date of Patent: Jul. 30, 2013

(54) DEVICE AND METHOD FOR THE COHERENT MANAGEMENT OF DATA DERIVING FROM SURVEILLANCE SYSTEMS OF AN AIRCRAFT

(75) Inventors: Gabrielle De Brito, Lapeyrouse-Fossat (FR); Laurent Flotte, Aurade (FR); Gilles Francois, Toulouse (FR); Fabien Guilley, Merenvielle (FR); Nicolas Marty, Saint Sauveur (FR)

(73) Assignee: Thales, Neuilly sur Seine (FR)

( * ) Notice: Subject to any disclaimer, the term of this patent is extended or adjusted under 35 U.S.C. 154(b) by 347 days.

(21) Appl. No.: 12/973,763

(22) Filed: Dec. 20, 2010

(65) Prior Publication Data

US 2011/0153212 A1    Jun. 23, 2011

(30) Foreign Application Priority Data

Dec. 23, 2009   (FR) ..................................... 09 06265

(51) Int. Cl.
    *G05D 1/00*    (2006.01)
(52) U.S. Cl.
    USPC ............ 701/1; 701/3; 701/9; 701/13; 701/14; 340/945; 340/438
(58) Field of Classification Search
    USPC .................. 701/2, 3, 9, 13–16, 301; 340/901, 340/903, 945, 435, 436, 438
    See application file for complete search history.

(56) References Cited

U.S. PATENT DOCUMENTS

| | | | |
|---|---|---|---|
| 6,076,042 A * | 6/2000 | Tognazzini | 701/301 |
| 6,567,728 B1 | 5/2003 | Kelly et al. | |
| 8,024,078 B2 * | 9/2011 | Coulmeau et al. | 701/3 |
| 2006/0214816 A1 * | 9/2006 | Schell | 340/961 |
| 2008/0306639 A1 | 12/2008 | Fleury et al. | |
| 2009/0082954 A1 | 3/2009 | Ridenour, II | |
| 2010/0162255 A1 | 6/2010 | Guilley et al. | |

FOREIGN PATENT DOCUMENTS

| | | |
|---|---|---|
| EP | 1 857 781 A2 | 11/2007 |
| FR | 2940480 A1 | 6/2010 |

\* cited by examiner

*Primary Examiner* — Gertrude Arthur Jeanglaude
(74) *Attorney, Agent, or Firm* — Baker & Hostetler, LLP

(57) ABSTRACT

A device for the coherent management of data deriving from different surveillance systems of an aircraft includes: a flight management system, the function of which is to assist the crew in following a flight plan of the aircraft and an associated trajectory; a surveillance system, the function of which is to detect any obstacles in proximity to the aircraft; a warning management system, the function of which is to detect abnormal situations and to display for the crew, where appropriate, warnings, such as potentially critical alarms or non-critical alerts, and the associated procedures to be followed when such exist; in which said flight management system, said surveillance system and said warning management system are interconnected and cooperate so that at least the warning management system has access to the flight plan of the aircraft, and is configured to display for the crew a summary of the situation when the surveillance system detects an obstacle that the aircraft should avoid according to the flight plan, and to not display, consequently, unnecessary warnings.

8 Claims, 7 Drawing Sheets

DEVICE AND METHOD FOR THE COHERENT MANAGEMENT OF DATA DERIVING FROM SURVEILLANCE SYSTEMS OF AN AIRCRAFT

CROSS-REFERENCE TO RELATED APPLICATION

This application claims priority to foreign French patent application No. FR 0906265, filed on Dec. 23, 2009, the disclosure of which is incorporated by reference in its entirety.

FIELD OF THE INVENTION

The present invention relates generally to the management of warnings on board an aircraft. The general principle of the present invention consists in the coordination of different conventional embedded systems on board aircrafts, namely a flight management system, a surveillance system and a flight warning system so as to prevent, anticipate and manage the warnings generated for the attention of the crew.

BACKGROUND

Currently, aircraft are equipped with various independent embedded systems handling crew-assistance functions. Thus, the current aircraft generally comprise:
- a flight management system, known by the acronym FMS, responsible for navigation and, generally, for assisting in management of the flight;
- a surveillance system, standalone, of TAWS (Terrain Awareness Warning System) type, or integrated, of ISS (Integrated Surveillance System) type, responsible for a function known as "safety net", aiming to prevent risk linked to the environment of the aircraft, in particular the risks of collision; a weather radar may be associated with such a surveillance system; thus, a TAWS and a weather radar can be combined within an ISS;
- a flight warning system, FWS, responsible for communicating the various warnings to the crew and for displaying the associated procedure(s) when such procedures exist.

To give more detail, the current flight management systems, FMS, offer the interfaces the crew needs to enter and modify the route that the aeroplane will follow according to its flight plan. These systems are also responsible for the various calculations for optimizing the management of this route with respect to a number of criteria, such as the flight time or fuel consumption. The FMSs do not generate warnings linked to the environment of the craft. Moreover, they do not know the context in which the craft is moving, nor warnings deriving from the other systems of the aircraft. They are therefore not capable of managing the priorities between warnings, nor of presenting to the crew the procedures associated with said warnings.

The surveillance systems, in the form of a standalone computer of TAWS or weather radar type for example, or integrated in an ISS, fulfil a primary surveillance function with respect to the terrain, traffic or weather phenomena in the vicinity of the aircraft, and their role is to issue audible warnings when the operational margins are no longer observed, the objective being to enable the crew to react by, if necessary, undertaking an avoidance manoeuvre.

To handle their function, the surveillance systems, decoupled from the navigation systems, periodically compare the most probable trajectory that the aircraft is expected to follow with:
- a cross section of the terrain and with the obstacles being flown over obtained from a world or local digital terrain model embedded on board the computer, with respect to the TAWS;
- the situation of weather phenomena situated in the vicinity, with respect to the weather radar.

In the event of conflict, a spoken message is generally issued and the area originating the warning is presented on a cockpit screen.

However, the surveillance systems are limited: they generate only warnings, and do not present procedures to the crew to assist in resolving the situation that has provoked the warning.

The surveillance systems do not know the context in which the craft is moving, nor warnings deriving from the other systems of the aircraft. Nor, therefore, are they capable of managing priorities between warnings, or of presenting the associated procedures to the crew.

The flight warning systems, FWS, are responsible for managing the warnings issued by the embedded systems. The FWSs centralize the warnings issued and present them to the crew in order of priority. These systems are also responsible for the display of the associated procedures for resolving the warnings raised.

However, the FWSs do not know the trajectory being followed by the aircraft, nor the context in which the craft is moving. They do not know all the warnings deriving from the other systems of the aircraft and are not therefore able to optimally manage the priorities between warnings.

The general problem of the current situation is linked to the fact that the crew of an aircraft moves around in a highly charged cognitive environment. They in fact have to manage the various above-mentioned embedded systems in order to perform all the tasks necessary to the flight and to the guidance of the aircraft. These embedded systems subject the crew to a large number of audible and visual stimuli.

In this context, the known systems have the drawback of not being coupled in order to ensure operational continuity. The consequence of this drawback lies in the fact that inconsistencies may appear, so that unnecessary warnings are raised, or that a future problem is not anticipated.

For example, the integrated surveillance system, ISS, and the flight warning system, FWS, do not know the current flight phase of the aircraft, nor do they generally know its flight plan. The terrain awareness warning system, TAWS, integrated in the ISS, can therefore detect a risk of collision with an obstacle situated straight in front, and raise an associated warning, while the aircraft is located on a trajectory such that it is getting ready for a 90° turn, the warning consequently being unnecessary. Such situations can disturb the crew.

The solutions to these problems, in the state of the art, consist either in deactivating the TAWS-type surveillance system when the aircraft is getting ready to land or take off, or in integrating a flight plan verification function in the TAWS-type surveillance system so that it can inform the crew of the margin that it has with respect to a risk, taking into account the flight plan.

The drawback, in the case of the deactivation of the TAWS, is obvious: the aircraft no longer has an active collision-avoidance surveillance system in the landing or take-off phase. The second case, corresponding to the integration of a flight plan verification function in the surveillance system, does not make it possible to prevent the appearance of unnecessary warnings; it does not handle the management of priorities between warnings, not being connected to the flight warning system FWS.

SUMMARY OF THE INVENTION

The invention resolves the problems noted by a device for the coherent management of data deriving from different surveillance systems of an aircraft, including: a flight management system, a function of which is to assist the crew in following a flight plan of the aircraft and an associated trajectory; a surveillance system, a function of which is to detect any obstacles in proximity to the aircraft; a flight warning system, a function of which is to detect abnormal situations and to display for the crew, where appropriate, warnings, and the associated procedures to be followed when such exist; wherein said flight management system, said surveillance system and said flight warning system are interconnected and cooperate so that at least the warning management system has access to the flight plan of the aircraft, and is configured to display for the crew of said aircraft a summary of the situation when the surveillance system detects a possible but avoidable warning, so as not to raise any unnecessary warnings.

The invention also resolves the problems noted by a method implemented by the aforementioned device, providing all the following functions: warning prevention, so as to prevent the issuing of unnecessary warnings by the surveillance system; early warning management from the surveillance system; and post-warning management, including proposing to the crew one or more procedures for managing the trajectory of the aircraft after a warning issued by the surveillance system has led the aircraft to depart from its initial flight plan. The basic principle of the invention consists in coupling the flight management system with the surveillance system and the alarm management system.

To this end, the subject of the invention is a device for the coherent management of data deriving from different surveillance systems of an aircraft, comprising:
  a flight management system, the function of which is to assist the crew in following a flight plan of the aircraft and an associated trajectory;
    a surveillance system, the function of which is to detect any obstacles in proximity to the aircraft;
    a flight warning system, the function of which is to detect abnormal situations and to display for the crew, where appropriate, warnings, and the associated procedures to be followed when such exist;
advantageously, said flight management system, said surveillance system and said flight warning system are interconnected and cooperate so that at least the warning management system has access to the flight plan of the aircraft, and is configured to display for the crew a summary of the situation when the surveillance system detects a possible but avoidable warning, so as not to raise any unnecessary warnings.

Advantageously, the surveillance system comprises a terrain collision-avoidance warning system, or TAWS standing for Terrain Awareness Warning System.

Advantageously, the surveillance system comprises a weather radar.

The invention also consists of a method likely to be implemented by the device according to the invention described hereinabove, and making it possible to provide all the following functions:
  warning prevention, so as to prevent the issuing of unnecessary warnings by the surveillance system;
  early warning management from the surveillance system;
  post-warning management, consisting in proposing to the crew one or more procedures for managing the trajectory of the aircraft after a warning issued by the surveillance system has led the aircraft to depart from its initial flight plan.

Advantageously, the warning prevention function comprises a function for adapting the behaviour of the surveillance system consisting in:
  completely disabling the surveillance system; or in:
  disabling the warnings originating from the surveillance system while displaying to the crew a summary of the situation leading to the possibility of a warning; or in:
  updating the surveillance system.

Advantageously, the early management function for warnings originating from the surveillance system includes adaptation of the flight plan.

Advantageously, the post-warning management function comprises, when a warning has been raised then acknowledged after a manoeuvre that has led the aircraft to depart from its initial flight plan, the display to the crew of a suitable procedure or of a list of procedures from which the crew is prompted to choose the appropriate procedure that it wants to implement, so as to manage the continuation of the flight of the aircraft, and consisting in:
  preparing a new flight plan for the aircraft;
  calculating a rejoining trajectory with a view to rejoining the initial flight plan of the aircraft.

Advantageously, the post-warning management function includes the display to the crew of a set of tasks to be completed to implement said suitable procedure.

BRIEF DESCRIPTION OF THE DRAWINGS

Other features and advantages of the invention will become apparent from the following description, given in light of the appended drawings which represent.

DETAILED DESCRIPTION

Figure 1:
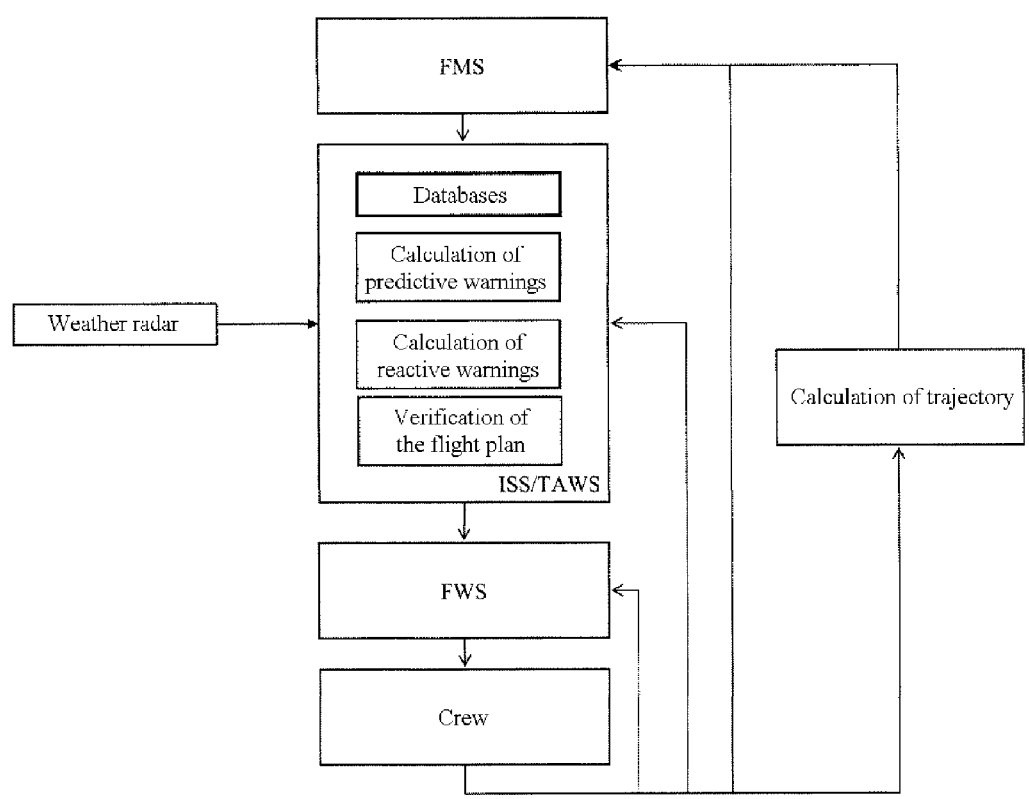
FIG. 1: the block diagram of the principle of the device and of the method according to the invention.

FIG. 1 presents a block diagram of the general principle of the invention. As seen previously, the present invention consists in coupling a flight management system FMS with a surveillance system ISS/TAWS, integrated or standalone, possibly having a "flight plan verification" function, and a flight warning system FWS.

As indicated in FIG. 1, the surveillance system ISS/TAWS comprises a "database", and warning calculation functions, for example a "predictive warning calculation" function and a "reactive warning calculation" function. The particular purpose of these functions is to prevent any risk of collision with an obstacle. A "weather radar" may also be associated with the surveillance system ISS/TAWS with respect to warnings linked to possible weather phenomena in the vicinity of the aircraft.

The interconnection and coupling between the flight management system FMS, surveillance system ISS/TAWS and flight warning system FWS make it possible to complete three types of function simultaneously, which was not possible in the prior art. These three types of function are illustrated respectively by FIGS. 2a and 2b, 3a and 3c, and 4a and 4d.

Figure 2A:
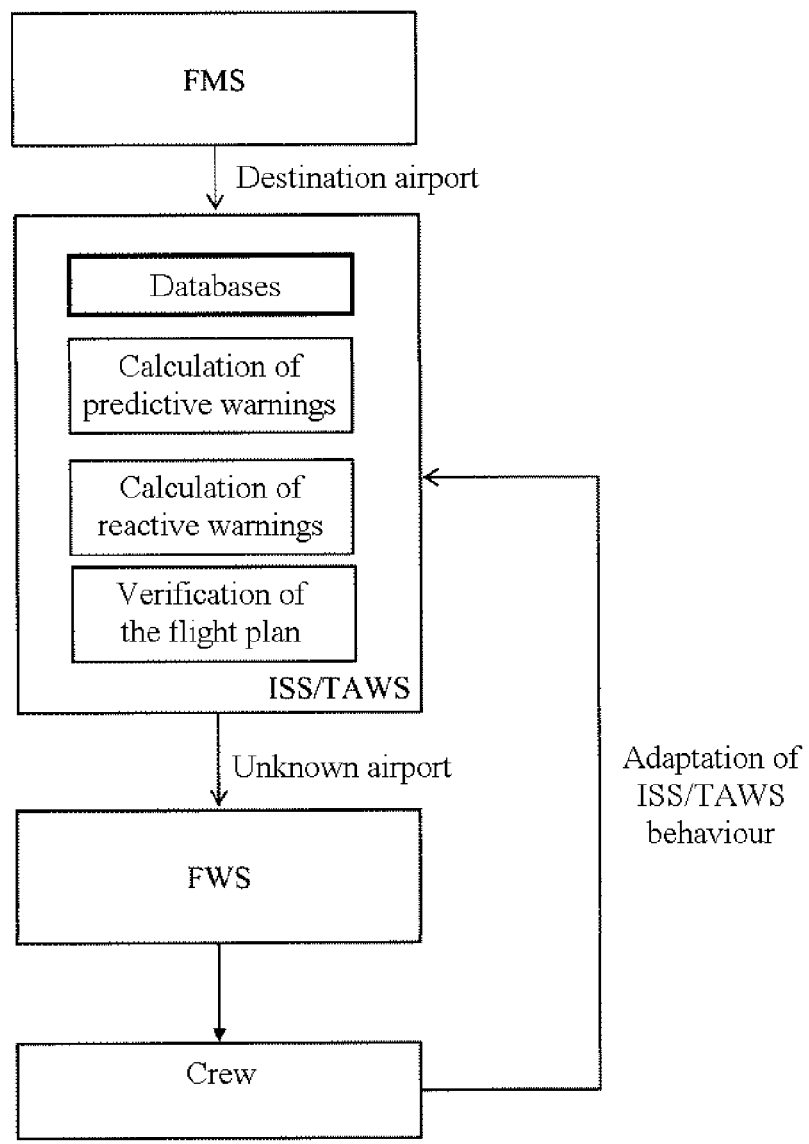
FIG. 2a: a block diagram presenting a first case of application of the invention.
Figure 2B:
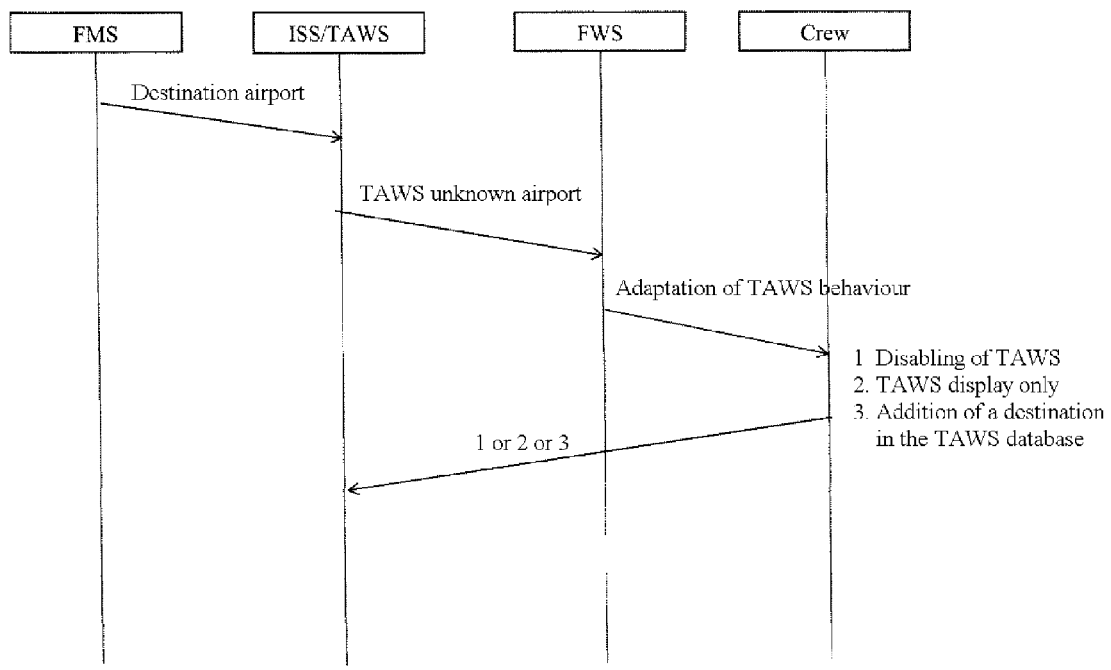
FIG. 2b: a diagram sequentially presenting the first case of application of the invention.

FIGS. 2a and 2b illustrate, through an example, the principle of implementing a warning prevention function using the device according to the invention, which makes it possible to implement the method according to the invention.

This warning prevention function aims to avoid the triggering of unnecessary warnings that risk unwisely polluting the crew's audible and visual environment. In particular, as illustrated in FIGS. 2a and 2b, this function consists in preventing the appearance of a warning originating from the surveillance system TAWS, due to a "destination airport" not referenced in the "database" of the surveillance system ISS/TAWS. In practice, if the "destination airport" is not referenced or is incorrectly referenced in the "database", the surveillance system ISS/TAWS generates a warning.

As appears in the sequential diagram of FIG. 2b, the operation of the method according to the invention, with respect to the warning prevention function, is as follows:
  the flight management system FMS sends the "destination airport" information to the surveillance system ISS/TAWS.
  the surveillance system ISS/TAWS then checks that this airport is correctly referenced in its "database".
  if the airport is not referenced in the "database" of the surveillance system ISS/TAWS, the latter flags this via the "unknown airport" event to the flight warning system FWS.
  the flight warning system FWS offers the crew a choice from a set of procedures to anticipate and prevent the appearance of warnings issued by the surveillance system ISS/TAWS. The procedures proposed, with a view to "adapting the ISS/TAWS behaviour", are:
    complete disabling of the surveillance system ISS/TAWS, at a certain distance/altitude from the airport;
    disabling of the warnings originating from the surveillance system ISS/TAWS and conservation of the display of the presence of a conflict and, for example, of the terrain cross section, at a certain distance/altitude from the airport;
    the recognition by the surveillance system ISS/TAWS of the coordinates of the destination airport for calculation of the inhibition areas, and the updating of the "database" of the surveillance system ISS/TAWS.
  finally, depending on the procedure chosen by the crew, the implementation of the method according to the invention may provide for the display to the crew, via a human-machine interface that has a screen, of all the tasks that make it possible to complete the various actions set out in said chosen procedure.

Optionally, the surveillance system ISS/TAWS can check the theoretical presence or absence of runway or airport, and on this topic, compare the indications in the flight plan and those of its own "database".

Figure 3A:
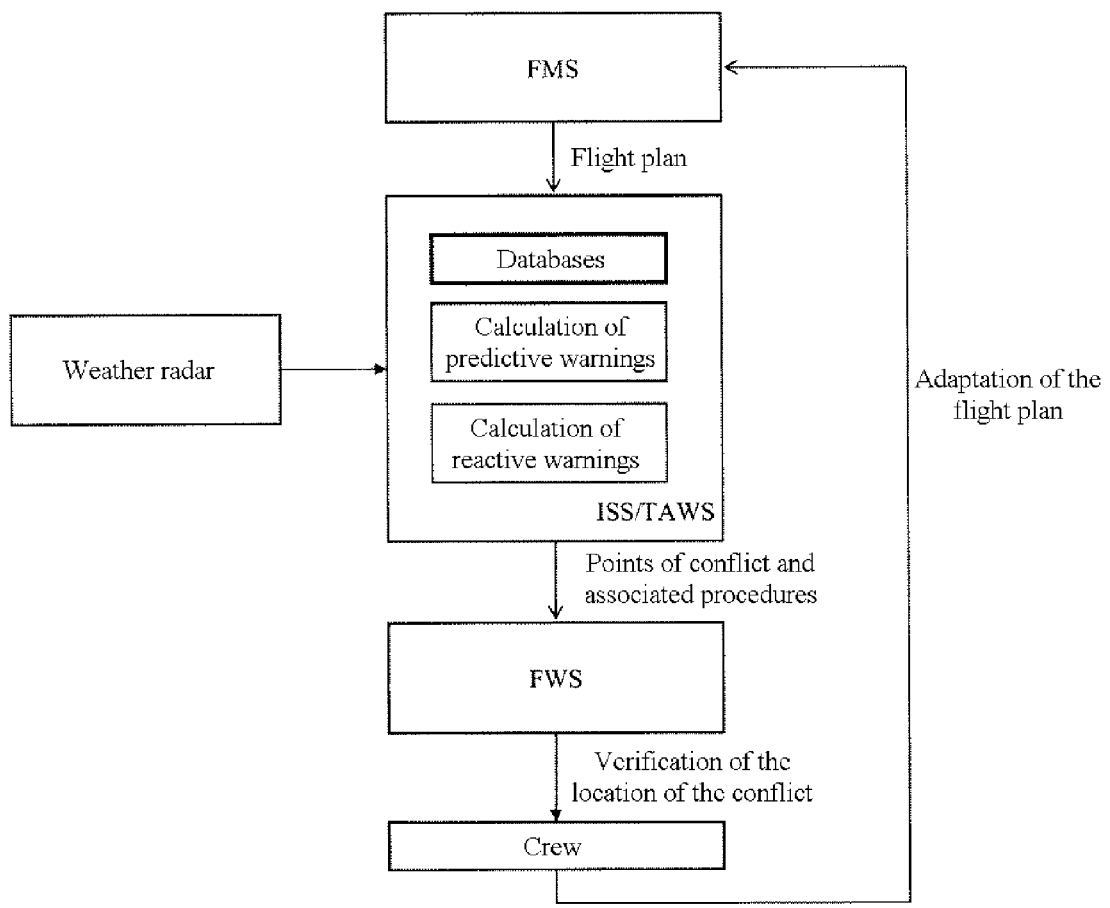
FIG. 3a: a block diagram presenting a second case of application of the invention.
Figure 3B:
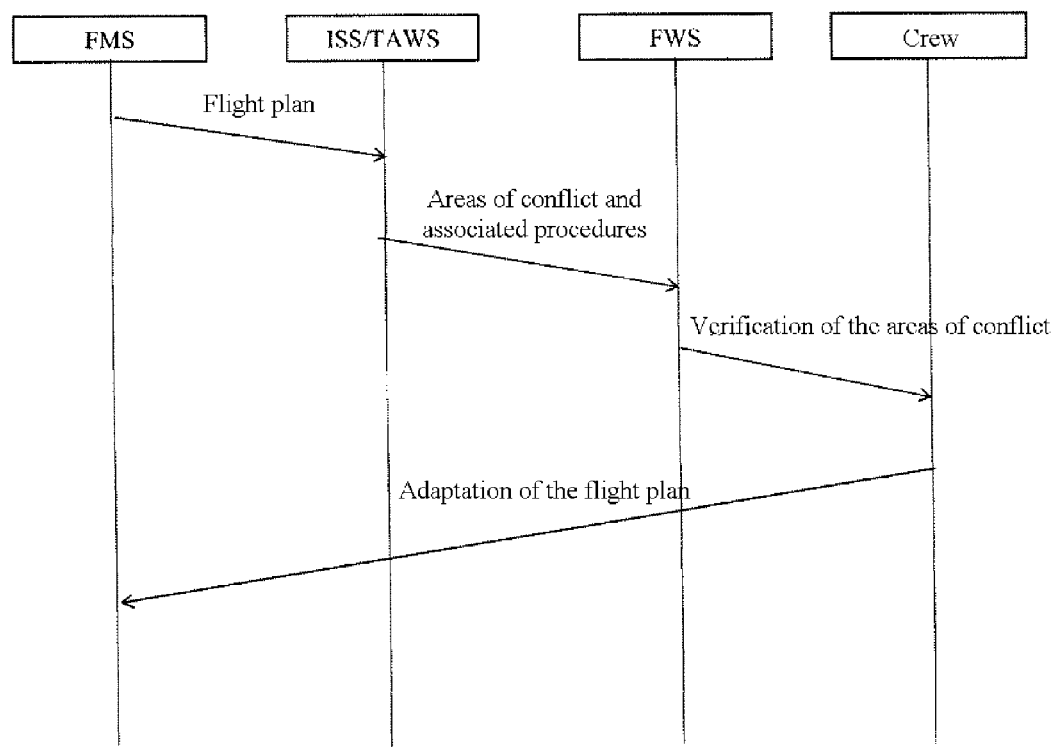
FIG. 3b: a diagram sequentially presenting the second case of application of the invention.

FIGS. 3a and 3b illustrate the implementation of an early management function for warnings originating from the surveillance system ISS/TAWS.

The aim of this function is to prevent the appearance of warnings originating from the surveillance system ISS/TAWS, when these warnings can be identified early in the flight plan. Implementing this function requires the presence of the "flight plan verification" function within the surveillance system ISS/TAWS.

As shown by the sequential diagram of FIG. 3b, implementing this early management function for warnings originating from the surveillance system ISS/TAWS, possibly associated with a "weather radar", is as follows:
  the flight management system FMS sends the "flight plan" and the trajectory of the aircraft to the surveillance system ISS/TAWS, provided with the "flight plan verification" function.
  the surveillance system ISS/TAWS then checks to see if there is a conflict between said trajectory and at least one of the following elements, expected to be encountered on the planned trajectory:
    the terrain;
    obstacles;
    safety altitudes;
    the weather.
  in the event of conflict, the surveillance system ISS/TAWS flags the "areas of conflict and associated procedures" to the flight warning system FWS.
  the flight warning system FWS then presents to the crew the various areas of the flight plan causing the conflict, possibly arranged in descending order of criticality in the form of a list, for "verification of the areas of conflict" by the crew. The crew is thus able to eliminate the various at-risk areas one by one, where appropriate via an "adaptation of the flight plan".

Figure 4A:
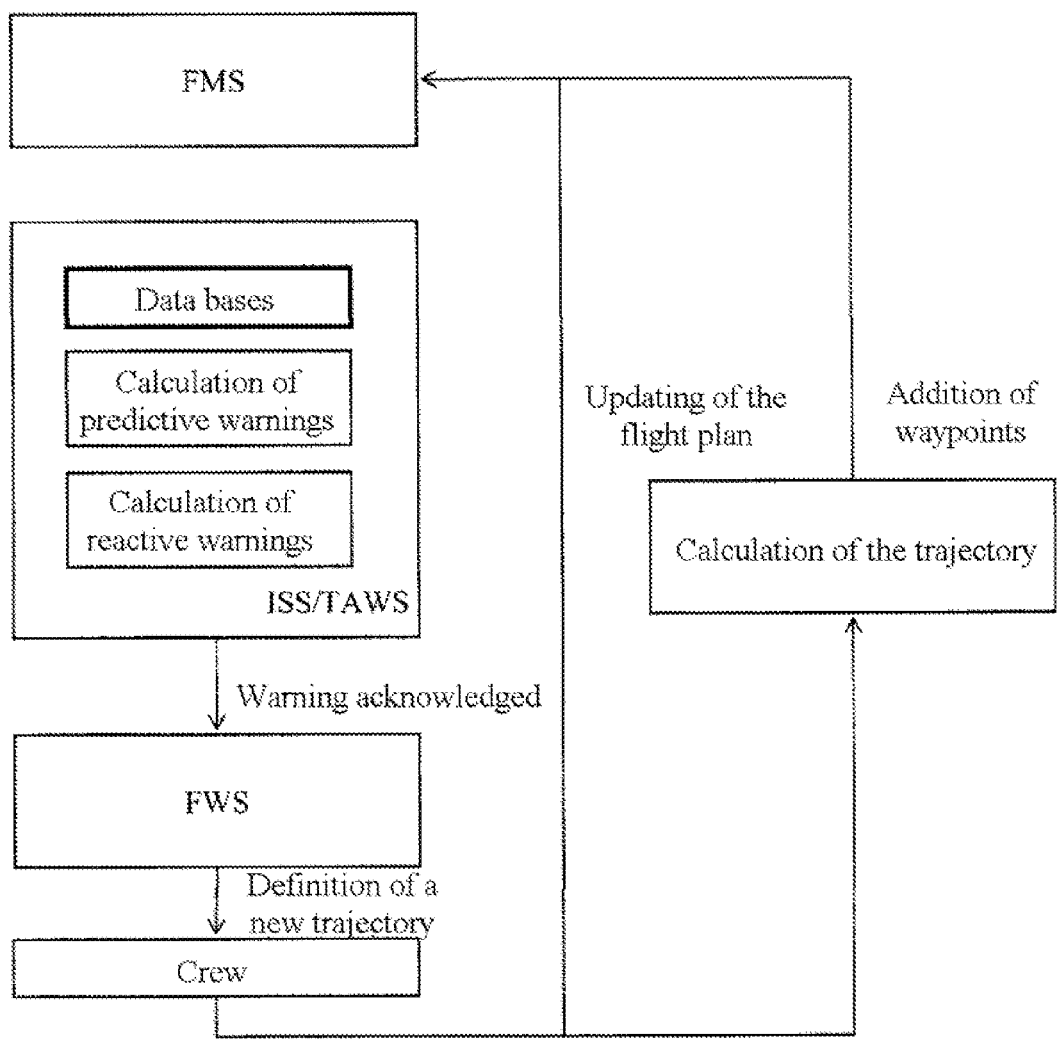
FIG. 4a: a block diagram presenting a third case of application of the invention.
Figure 4B:
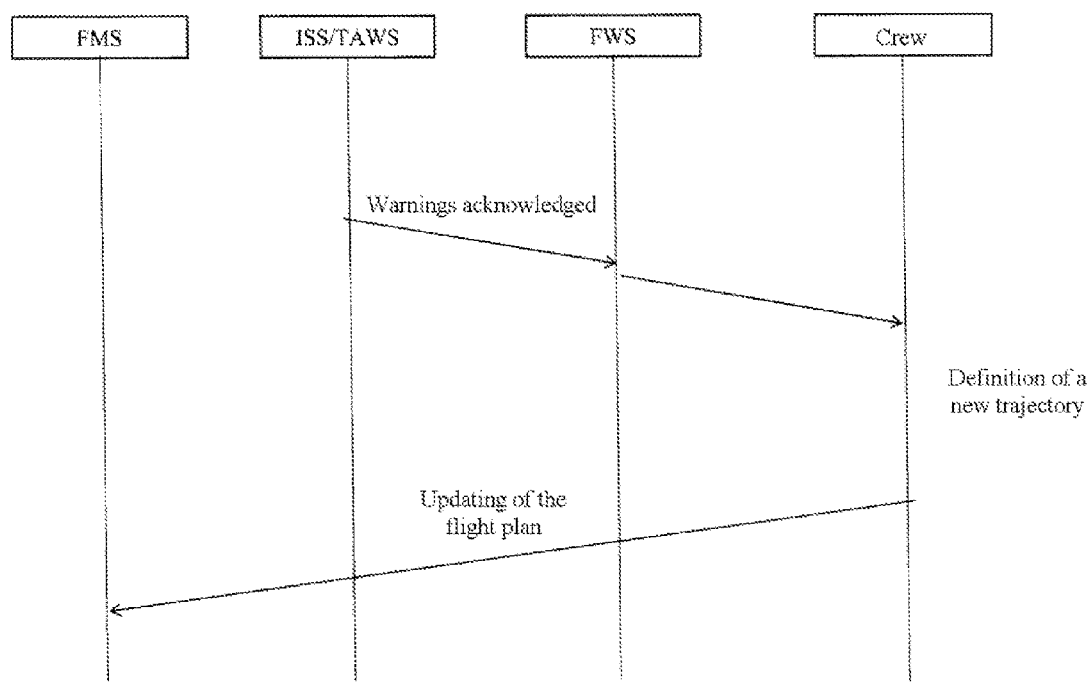
FIG. 4b: a diagram sequentially presenting the third case of application of the invention.

FIGS. 4a and 4b illustrate the implementation of a post-warning management function, when a warning has actually been issued at the initiative of the surveillance system ISS/TAWS and then been acknowledged, the aircraft having had to depart from its flight plan, for example after an avoidance manoeuvre.

As indicated in the sequential diagram of FIG. 4b, the operation is then as follows:
  the surveillance system ISS/TAWS signals to the flight warning system FWS that the warning issued at the initiative of the surveillance system ISS/TAWS has been acknowledged.
  the flight warning system then proposes a choice of procedures to the crew for post-warning management purposes. These proposed procedures are:
    the manual creation of a new flight plan;
    the automatic calculation, by means of any known method, of a trajectory for rejoining the initial flight plan; this calculation may be validated by implementing the "flight plan verification" function in order to check the possible presence of conflicts between the calculated rejoining trajectory and the terrain, obstacles or the weather, and do so at any point on said rejoining trajectory; the rejoining trajectory is then transferred to the flight management system FMS which will manage the following of this rejoining trajectory by the aircraft.
  finally, depending on the procedure chosen by the crew, the implementation of the method according to the invention may provide for the display to the crew, via a human-machine interface that has a screen, of all the tasks that make it possible to complete the various actions set out in said chosen procedure.

It can be seen that, in all the cases, it is possible to use as flight warning system the one disclosed in the French patent application No. 0807405.

To sum up, the invention lies in a device and a method allowing for a coherent management of the warnings originating from different surveillance systems, offering the main advantage of allowing for the implementation, simultaneously, of a warning prevention function, of an early warning management function and of a post-warning management function.

To achieve this objective, the device according to the invention provides for the coupling of a flight management system, a surveillance system, and a flight warning system, these systems being conventionally embedded in most aircraft. However, in the state of the art, these three systems are not interconnected, and do not cooperate.

The invention claimed is:

1. A device for coherent management of data deriving from different surveillance systems of an aircraft, comprising:
    a flight management system, a function of which is to assist a crew in following a flight plan of the aircraft and an associated trajectory;
    a surveillance system, a function of which is to detect any obstacles in proximity to the aircraft; and
    a flight warning system, a function of which is to detect abnormal situations and to display for the crew, where appropriate, warnings, and associated procedures to be followed when such exist;
    wherein said flight management system, said surveillance system and said flight warning system are interconnected and cooperate so that at least the flight warning system has access to the flight plan of the aircraft, and is configured to display for the crew of said aircraft a summary of a situation when the surveillance system detects a possible but avoidable warning, so as not to raise any unnecessary warnings;
    wherein the device is further configured with a warning prevention function, so as to prevent issuing of unnecessary warnings by the surveillance system;
    wherein the device is further configured with an early warning management function from the surveillance system; and
    wherein the device is further configured with a post-warning management function, including proposing to the crew one or more procedures for managing a trajectory of the aircraft after a warning issued by the surveillance system has led the aircraft to depart from its initial flight plan.

2. A device according to claim 1, wherein said surveillance system further comprises a terrain collision-avoidance warning system, or TAWS standing for Terrain Awareness Warning System.

3. A device according to claim 1, wherein said surveillance system further comprises a weather radar.

4. A method implemented by a device for coherent management of data derived from different surveillance systems of an aircraft, comprising a flight management system, a function of which is to assist a crew in following a flight plan of the aircraft and an associated trajectory; a surveillance system, a function of which is to detect any obstacles in proximity to the aircraft; a flight warning system, a function of which is to detect abnormal situations and to display for the crew, where appropriate, warnings, and associated procedures to be followed when such exist; and wherein said flight management system, said surveillance system and said flight warning system are interconnected and cooperate so that at least the flight warning system has access to the flight plan of the aircraft, and is configured to display for the crew of said aircraft a summary of a situation when the surveillance system detects a possible but avoidable warning, so as not to raise any unnecessary warnings, the method comprising:
    allowing warning prevention, so as to prevent the issuing of unnecessary warnings by the surveillance system;
    allowing early warning management from the surveillance system; and
    allowing post-warning management, including proposing to the crew one or more procedures for managing the trajectory of the aircraft after a warning issued by the surveillance system has led the aircraft to depart from its initial flight plan.

5. A method according to claim 4, wherein said warning prevention function comprises a function for adapting the behaviour of the surveillance system including:
    completely disabling the surveillance system;
    or in: disabling the warnings originating from the surveillance system while displaying to the crew a summary of the situation leading to the possibility of a warning;
    or in: updating the surveillance system.

6. A method according to claim 4, wherein the early management function for warnings originating from the surveillance system includes adaptation of the flight plan.

7. A method according to claim 4, wherein the post-warning management function comprises, when a warning has been raised then acknowledged after a manoeuvre that has led the aircraft to depart from its initial flight plan, the display to the crew of a suitable procedure or of a list of procedures from which the crew is prompted to choose the appropriate procedure that it wants to implement, so as to manage the continuation of the flight of the aircraft, and including:
    preparing a new flight plan for the aircraft;
    calculating a rejoining trajectory with a view to rejoining the initial flight plan of the aircraft.

8. A method according to claim 7, wherein said post-warning management function includes the display to the crew of a set of tasks to be completed to implement said suitable procedure.

* * * * *